United States Patent
VandenBerge et al.

[11] Patent Number: 5,186,512
[45] Date of Patent: Feb. 16, 1993

[54] REAR WINDOW SLIDING VISOR

[75] Inventors: Thomas C. VandenBerge, Jenison; Jerry M. DeJong, West Olive; Michael J. Suman, Holland, all of Mich.

[73] Assignee: Prince Corporation, Holland, Mich.

[21] Appl. No.: 869,755

[22] Filed: Apr. 16, 1992

[51] Int. Cl.$^5$ .................................. B60J 3/02
[52] U.S. Cl. .......................... 296/97.8; 296/97.4; 296/97.11; 160/370.2
[58] Field of Search ............ 296/97.8, 97.4, 97.11; 160/370.2

[56] References Cited

U.S. PATENT DOCUMENTS

| Re. 24,706 | 9/1959 | McCormick | 296/97.8 |
|---|---|---|---|
| 2,289,644 | 7/1942 | Gano, Jr. | 296/97.8 |
| 2,444,524 | 7/1948 | Parrish, Jr. | 296/97.11 |
| 2,559,471 | 7/1951 | Schrock | 296/97.11 |
| 2,829,003 | 4/1958 | Moyes | 296/97.8 |
| 4,149,749 | 4/1979 | Canal | 296/97.8 |
| 4,468,062 | 8/1984 | Marcus et al. | 296/97.8 |
| 4,491,360 | 1/1985 | Fleming | 296/97.8 |
| 4,492,404 | 1/1985 | Marcus et al. | 296/97.8 |
| 4,558,599 | 12/1985 | Chu et al. | 296/97.8 |
| 4,758,041 | 7/1988 | Hofeur | 296/97.8 |
| 4,844,530 | 7/1989 | Mahler et al. | 296/97.1 |
| 4,902,062 | 2/1990 | Pusic et al. | 296/97.4 |
| 4,904,013 | 2/1990 | Canadas | 296/97.4 |
| 4,929,014 | 5/1990 | Clark et al. | 296/97.8 |
| 4,986,592 | 1/1991 | Kaiser et al. | 296/97.8 |
| 4,989,910 | 2/1991 | Mersman et al. | 296/97.4 |
| 5,000,506 | 3/1991 | Abu-Shumays et al. | 296/97.8 |

FOREIGN PATENT DOCUMENTS 1102089 7/1968 United Kingdom .

Primary Examiner—Robert R. Song
Attorney, Agent, or Firm—Price, Heneveld, Cooper, DeWitt & Litton

[57] ABSTRACT

A visor system includes a generally planar visor body having parallel guide rails extending along opposite sides and extending beyond the visor body. The rails preferably have a circular cross-section and are slideably received in a pair of spaced polymeric guide tracks having slots of corresponding cross-section. The guide tracks in the preferred embodiment are defined by extruded members mounted in parallel spaced relationship to each other on the vehicle headliner for sliding movement of the visor panel in the space between the vehicle roof and the headliner. In a preferred embodiment, the guide rails are defined by a polymeric U-shaped circular rod extending around three sides of the visor panel and can be integrally formed with the visor panel or separately attached thereto.

24 Claims, 1 Drawing Sheet

REAR WINDOW SLIDING VISOR

BACKGROUND OF THE INVENTION

The present invention pertains to a vehicle visor and particularly one suited for use in connection with the rear window of a vehicle.

There exists a variety of visor systems partially or completely covering a window. U.S. Pat. No. 4,929,014, for example, discloses a front windshield cover which can be lowered partially to serve as a visor during use or lowered completely for enclosing the windshield when the vehicle is parked to reduce the interior heating of the vehicle by sunlight. This system employs a plurality of overlying slats with guide means interconnecting them for sliding movement from behind the headliner at the front of the vehicle roof. U.S. Pat. No. 2,829,003 discloses a early design for a rear window visor which attaches on the inside of a vehicle roof and is exposed to view. This visor is installed as an aftermarket item and the curved visor pivots and slides at its corner edges and is controlled along a central guide. A variety of other sliding visor constructions such as represented by U.S. Pat. No. 2,289,644, have also been proposed for use in connection with vehicles.

These systems, although providing sunblocking protection, are either not uniquely adapted for use in a concealed headliner installation or are somewhat complicated and therefore costly in today's cost conscious automotive market. Also, it has been discovered that planar visors which are guided by rectangular edge slots do not slide consistently and thus provide the desired control or "feel" during use. Such a visor can be subject to sticking and uneven movement due in part to the extreme ambient conditions to which the visor is subjected in the automotive environment.

Accordingly, there exists a need for a relatively inexpensive and yet functional sliding visor panel for use particularly for the rear window area of a vehicle.

SUMMARY OF THE PRESENT INVENTION

The system of the present invention provides a visor panel which is particularly adapted for use in connection with the rear window of a vehicle and which includes a generally planar visor body having parallel guide rails extending along opposite sides and extending beyond the visor body. The rails preferably have a circular cross-section and are slideably received in a pair of spaced polymeric guide tracks having slots of corresponding cross-section. The guide tracks in the preferred embodiment are defined by extruded members mounted in parallel spaced relationship to each other on the vehicle headliner for sliding movement of the visor panel in the space between the vehicle roof and the headliner.

In a preferred embodiment, the guide rails are defined by a polymeric U-shaped circular rod extending around three sides of the visor panel and can be integrally formed with the visor panel or separately attached thereto. A gap between the headliner and roof is provided at the upper edge of the vehicle rear window to allow extension and retraction of the visor panel therethrough. In a preferred embodiment of the invention also, the visor panel includes a center guide slot and a guide post extending therethrough for providing additional stability to the visor in its movement.

These and other features, objects, and advantages of the present invention will become apparent upon reading the following description thereof together with reference to the accompanying drawings in which:

DETAILED DESCRIPTION OF THE PREFERRED EMBODIMENT

Figure 1:
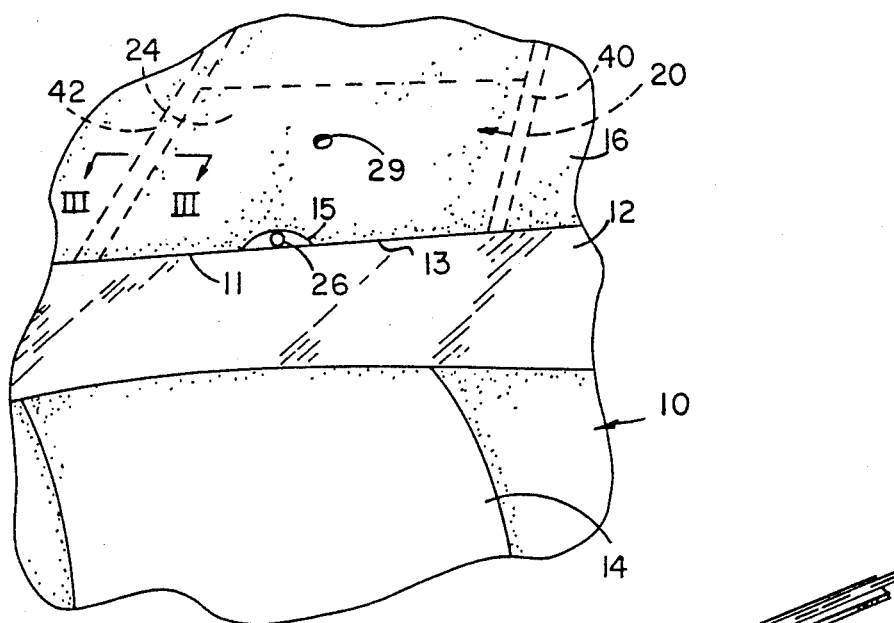
FIG. 1 is a fragmentary perspective view of a vehicle embodying a visor assembly of the present invention.

Referring initially to FIG. 1, there is shown a vehicle 10 such as an automobile and particularly the rear interior area of a vehicle showing a rear window 12 above and behind a rear seat 14. The vehicle includes a roof 22 (FIG. 3) covered with an integral headliner 16 which is covered by an upholstery material 17 (FIG. 3) to match the decor of the interior of the vehicle. The headliner can be molded of a suitable fibrous mat material 18 (FIG. 3) or other conventionally used headliner material and is attached to the underlying roof support structure of the vehicle utilizing any number of conventional fastening systems.

A visor system 20 of the present invention is mounted above the headliner 16 in the area adjacent the upper edge 11 of rear window 12 and slides between a stored position behind the headliner as seen in FIG. 1 to a lowered use position covering the rear window 12 as desired for blocking sun. Thus, the rear visor assembly 20 can be employed when the vehicle is parked, for example, for completely enclosing the rear window 12 for reducing sunload and interior heating of the vehicle or it can be partially lowered by the rear seat passenger to perform a conventional sunblocking function without obstructing the rear vision of the driver.

Figure 2:
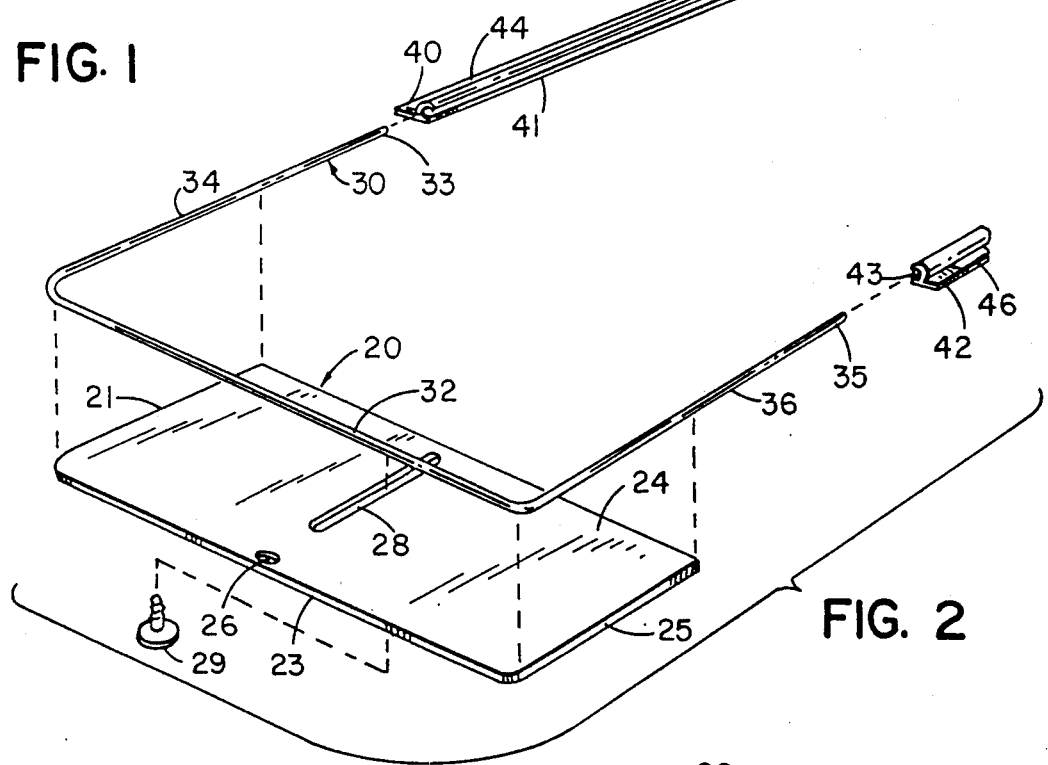
FIG. 2 is an enlarged fragmentary exploded view of the visor assembly embodying the present invention.
Figure 3:
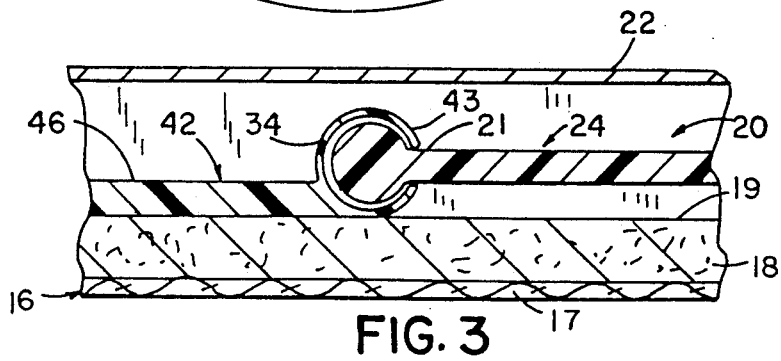
FIG. 3 is a greatly enlarged fragmentary cross-sectional view of the visor assembly embodying the present invention taken along section line III—III in FIG. 1.

The visor system 20 is best seen in FIGS. 2 and 3 and includes a generally rectangular planar body 24 made of a suitable polymeric material such as polycarbonate and having a width substantially that of the width of the rear window 12 and a length sufficient to fully cover a rear window if desired. The panel is relatively thin and flexible having a thickness, in a preferred embodiment, of about ⅛ of an inch although a range of thicknesses can be employed. The panel can also be made of a fiberboard material if desired. Extending around the peripheral edges 21, 23 and 25 of panel 24 is a U-shaped guide rail 30 having a base leg 32 extending along edge 23, a first side leg 34 extending along edge 21 and a second side leg 36 extending along edge 25 of panel 24. Guide rail 30 serves to provide structural support for the relatively thin panel as well as provide a sliding interface with the guide tracks in which the legs of the rail extend. When the panel 24 is made of a fiberboard material different than the polymeric U-shaped rail, the two elements are bonded together using a suitable adhesive. In the event that panel 24 and guide rail 30 are of the same material, they can be integrally molded with the edges 23 and 25 of the panel being centered along the longitudinal axis of the circular cross-section guide rail as best seen in FIG. 3. In either embodiment, guide 30 is made of a lubricious polymeric material such as polycarbonate, ABS or the like to provide a non-sticking interface with the tracks 40 and 42 into which the the legs of the guide extend.

Panel 24 includes a fingerhold aperture 26 as seen in FIG. 1, which is positioned in alignment with a recess 15 in headliner 16 such that a vehicle occupant can easily raise and lower the visor panel. Additionally, panel 24 includes a slot 28 extending along its centerline for providing additional guiding and stability to the visor as it is moved between raised and lower positions. A guide pin 29 having an enlarged head and a shank with locking flanges extends through slot 28 and into a supporting member (not shown) of the sheet metal roof 22. The head of guide pin 29, as seen in FIG. 1, extends on the outer surface of headliner 16. For such purpose, the pin 29 is made of a material colored to match that of upholstery 17 and may include a pebble grain finish. Thus, the edges of slot 28 of visor panel 24 will slide along the fixed guide pin 29 in its movement between the stored retracted position and lowered use positions. To permit full extension of the visor panel, slot 28 extends a substantial portion of the length of the panel.

The ends 33 and 35 of the U-shaped guide 30 extend well beyond the edges 21 and 25 of visor panel 24, as best seen in FIG. 2, and fit into polymeric support tracks or channels 40 and 42 which include inwardly facing C-shaped slots 41 and 43 respectively. The circular generally C-shaped slots integrally extend from mounting flanges 44 and 46 of members 40 and 42 respectively. Members 40 and 42 are extruded polymeric members with the diameter of the C-shaped slots being slightly larger than the diameter of the ends 33 and 35 of circular guide 30 as best seen in FIG. 3 such that the visor panel is guidably held and controlled by the guide track means defined by members 40 and 42. The mounting flanges 44 and 46 are secured to the top surface 19 (FIG. 3) of headliner 16 by a suitable bonding adhesive although they could also be attached to the sheet metal roof of the vehicle if desired. For purposes of assembly as a completed unit, however, it is preferable to mount the visor assembly 20 to the headliner which can be attached to the vehicle roof during assembly as a completed installation with snap-in pin 29 pushed into an aperture in the underlying sheet metal support structure of the roof. This guide also forms part of the support attachment of the headliner to the vehicle during assembly.

The extruded guide tracks 40 and 42 extend, as best seen in FIG. 1, from the lower edge of headliner 16 adjacent the upper edge 11 of rear window 12 forwardly sufficiently to provide a full range of movement for the visor. Tracks 40 and 42 are spaced apart in parallel relationship a distance equal to the spacing between legs 34 and 36 of guide rail 30. Accordingly, the guide rails defined by legs 34 and 36 slideably fit within the guide slots 41 and 43 of the extruded guides 40 and 42 respectively for allowing the controlled sliding movement of visor panel 24 between its stored and various use positions. The lubricious polymeric interface between the guide tracks and guide rails assure controlled and smooth motion of the visor panel in its operation.

In some embodiments, the additional guide slot 28 may not be desired or necessary, however, in the preferred embodiment, the pin 29 serves not only to provide additional stability to the elongated visor panel 24 but also assists in attaching the headliner to the roof of the vehicle. As seen in FIG. 3, there exists a sufficient space between the inner surface of roof 22 and the upper surface 19 of headliner 16 to accommodate the relatively flat visor assembly 20 of the present invention. The lower edge of the headliner adjacent window 12 includes a gap 13 between the roof and headliner to permit extension or retraction of the visor panel from behind the headliner. It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A sliding visor assembly for mounting in the space between a vehicle headliner and roof comprising:
   a pair of guide members defining guide slots and means for mounting said guide members to a vehicle such that said guide slots face one another in spaced parallel relationship and extend in a direction orthogonal to a vehicle window; and
   a generally rectangular visor panel and guide rail means attached thereto and extending from opposite edges of said visor panel outwardly from an edge of said panel extending between said opposite edges a distance from said visor panel sufficient to permit the extension of said visor panel from behind the vehicle headliner to a position for blocking at least a substantial portion of the adjacent window, wherein said guide rails are spaced to slideably fit within said guide slots defined by said guide members.

2. The apparatus as defined in claim 1 wherein said guide rail comprises a U-shaped member having a circular cross-section and which is attached to extend around three sides of said visor panel.

3. The apparatus as defined in claim 2 wherein said visor panel and U-shaped guide member are integrally molded of a polymeric material.

4. The apparatus as defined in claim 3 wherein said guide slots are generally C-shaped in cross-section for receiving the circular guide rails therein.

5. The apparatus as defined in claim 4 wherein said mounting means for said guide member includes a mounting flange integrally formed with said C-shaped guide slot.

6. The apparatus as defined in claim 5 wherein said flange is positioned with respect to said C-shaped guide slot to be attached to the inner surface of a vehicle headliner for attachment of said visor assembly to the headliner.

7. The apparatus as defined in claim 1 wherein said pair of guide members and said guide rail means are made of a polymeric material.

8. The apparatus as defined in claim 7 wherein said guide rail means is a U-shaped member extending around three sides of said visor panel.

9. The apparatus as defined in claim 8 wherein said pair of guide members are extruded.

10. A sliding visor assembly for mounting in the space between a vehicle headliner and roof comprising:
   a pair of extruded guide members including generally C-shaped guide slots and integral flange means for mounting said guide members to a vehicle such that said guide slots face one another in spaced parallel relationship and extend in a direction orthogonal to a vehicle window; and
   a generally rectangular visor panel and circular cross-section guide rail means attached thereto and extending from opposite edges of said visor panel outwardly from an edge of said panel extending between said opposite edges a distance from said visor panel sufficient to permit the extension of said visor panel from behind the vehicle headliner to a position for blocking at least a substantial portion of the adjacent window, wherein said guide rails and guide members are spaced to slideably fit within said guide slots defined by said guide members.

11. The apparatus as defined in claim 10 wherein said guide rail comprises a U-shaped member attached to extend around three edges of said visor panel.

12. The apparatus as defined in claim 11 wherein said visor panel and U-shaped guide member are integrally molded of a polymeric material.

13. The apparatus as defined in claim 1 wherein said pair of guide members are made of a polymeric material.

14. The apparatus as defined in claim 13 wherein said visor panel includes a slot extending between said opposite edges and in parallel relationship thereto for receiving a guide pin.

15. The apparatus as defined in claim 14 wherein said visor panel includes a fingerhold formed therein for controlling the movement of said panel.

16. A sliding visor assembly for mounting to a vehicle headliner comprising:
a pair of extruded guide members including generally C-shaped guide slots and integral flange means for mounting said guide members to a vehicle headliner in spaced parallel relationship with said slots facing one another; and
a generally rectangular visor panel and a U-shaped circular cross-section guide rail attached thereto and including legs extending from opposite edges of said visor panel outwardly a distance from said visor panel sufficient to permit the extension of said visor panel from behind the vehicle headliner to a position for blocking at least a substantial portion of an adjacent window, wherein said guide rails and guide members are spaced to slideably fit within said guide slots defined by said guide members.

17. The apparatus as defined in claim 16 wherein said guide rail and said guide members are made of a polymeric material.

18. The apparatus as defined in claim 17 wherein said visor panel includes a slot extending between said opposite edges and in parallel relationship thereto for receiving a guide pin.

19. The apparatus as defined in claim 18 wherein said visor panel includes a fingerhold formed therein for controlling the movement of said panel.

20. A vehicle headliner assembly comprising:
a headliner shaped to cover the roof of a vehicle;
a pair of extruded guide members including generally C-shaped guide slots and integral flange means mounting said guide members to a surface of said headliner facing the vehicle roof and in spaced parallel relationship with said slots facing one another; and
a generally rectangular visor panel and circular cross-section guide rail means attached thereto and including legs extending from opposite edges of said visor panel outwardly a distance from said visor panel sufficient to permit the extension of said visor panel from behind said vehicle headliner to a position for blocking at least a substantial portion of an adjacent window, wherein said guide rails are spaced to slideably fit within said guide slots defined by said guide members.

21. The apparatus as defined in claim 20 wherein said guide rail means is U-shaped and is attached to said panel to extend around three sides thereof.

22. The apparatus as defined in claim 21 wherein said guide rail means and said guide members are made of a polymeric material.

23. The apparatus as defined in claim 17 wherein said visor panel includes a slot extending between said opposite edges and in parallel relationship thereto, and a guide pin extending through said headliner into said slot.

24. The apparatus as defined in claim 23 wherein said visor panel includes a fingerhold formed therein for controlling the movement of said panel.

* * * * *